INVENTOR.
D. E. LUPFER

United States Patent Office 3,095,887
Patented July 2, 1963

3,095,887
STREAM BLENDING METHOD AND APPARATUS
Dale E. Lupfer, Bartlesville, Okla., assignor to Phillips Petroleum Company, a corporation of Delaware
Filed Mar. 27, 1961, Ser. No. 98,544
5 Claims. (Cl. 137—3)

This invention relates to a method and to apparatus for blending multicomponent streams in variable ratios to produce a combined stream having controlled composition and flow rate.

Ordinarily the control of stream blending is accomplished by first blending the streams, then analyzing the composition of the resultant blend, and finally correcting the ratio in which the streams are blended as necessary to obtain the desired analysis. This method necessarily results in some off-specification blend because a deviation from the desired result is required in order to prompt a correction. This general method is known as "feedback" control. Flow rates of both feed streams must be controlled in order to maintain the blend stream constant in composition and in flow rate. Feedback control methods commonly involve interacting controls. By this is meant that a correction in the flow of one feed stream necessitates a correction in the flow of the second and vice versa. Off-specification blend is produced during the time required for the controls to reach equilibrium.

There are frequently situations in which existing physical limitations make it impossible or impractical to sample a blended stream for control purposes. For example, if two streams are fed separately to a reactor there is no way of determining by direct sample the composition of the combined streams prior to reaction. A comparable situation exists if the common conduit through which two such streams flow into a vessel is too short to effect thorough mixing, in which case a sample of material withdrawn from this conduit would not provide an analysis representative of the mixture.

According to my invention a "feed forward" control method and apparatus are provided which overcome the above discussed disadvantages. The method and apparatus of my invention can be employed to blend continuously a first fluid stream consisting essentially of components A and B in variable ratio with a second fluid stream consisting essentially of component B to form a third stream containing components A and B in a substantially constant ratio and flow rate. This control is accomplished by analyzing a sample of the first stream for component A, producing a first signal as a function of the fraction of said first stream that is component A, producing a second signal as a function of the ratio of said fraction to the desired flow rate of component A in said third stream, regulating the flow rate of said first stream in response to said second signal, producing a third signal as a function of the difference between the desired flow rate of said third stream and said flow rate of said first stream, and regulating the flow rate of said second stream in response to said third signal. In another aspect of my invention the method is applied to blending streams wherein the first stream consists essentially of components A and B and the second stream consists of components B and C in variable ratio wherein component C can be any material or mixture of materials different from components A and B. This control is accomplished by forming a sample stream from equal portions taken from the first and second streams and analyzing the sample stream for components A and B. The control of the first stream flow rate is carried out as described above while the flow rate of the second stream is regulated in response to a signal which is a function of the ratio $X/Y$ where X is the difference between the desired total flow rates of components A and B in said third stream and the flow rate of said first stream, and Y is the sum of twice the fractions of said sample stream which are components A and B minus 1.

The apparatus for my invention comprises first and second feed conduits connected to an outlet conduit with flow regulating means in each of said feed conduits, analyzing means connected to receive a sample stream from the first conduit and produce a first signal as a function of the fraction of said sample stream that is one component, computing means connected to receive said first signal for producing a second signal as a function of the ratio between the desired flow rate of said component in the outlet conduit and the fraction of said sample stream that is said component, means for manipulating the flow regulating means in said first conduit in response to said second signal, computing means connected to receive said second signal for producing a third signal as a function of the difference between the desired constant flow rate of material in the outlet conduit and the flow rate of material in said first conduit, and means for manipulating the flow regulating means in said second conduit in response to said third signal. The apparatus in another aspect of my invention includes, in addition to the above, means for withdrawing equal portions of material from the first and second conduits to form said sample stream, said analyzing means being capable of producing a signal as a function of the fraction of the sample stream that is a second component, and, in place of said third signal producing means, means for producing a fourth signal as a function of the difference between the desired total flow rates of both components in the outlet conduit and the flow rate of material in said first conduit, means for producing a fifth signal as a function of the sum of twice the fractions of said sample stream which are said components minus 1, and means for regulating the flow rate of the second stream in response to a signal which is a function of the ratio between said fourth and fifth signals.

It is an object of my invention to provide both method and apparatus for blending streams containing multiple components in variable ratios to produce a combined stream having controlled composition and flow rate of specific components. Another object of my invention is to provide a feed forward control system for blending two streams to produce a third stream of controlled composition and flow rate. Still another object is to provide a non-interacting control method for blending fluid streams. Another object is to provide in a polymerization process a method of controlling the feed streams in order to obtain a substantially constant monomer charge and constant ratio of monomer to solvent. Other objects, advantages and features of my invention will be apparent to those skilled in the art from the following disclosure and drawings in which:

The control features of this invention have broad utility in the blending of two fluid streams to produce a third stream of desired composition and flow rate. For example, it is particularly useful in dilution processes wherein a feed stream containing an additive is blended with more of the feed stream which does not contain the additive or which contains inert materials in variable amounts to produce a final stream which contains the additive in fixed ratio to the principal component. Alternatively the features of the invention can be applied to injecting an additive into a stream which already contains the additive in variable amounts. Gasoline blending is one such application and there are many more which will occur to those skilled in the art. Of particular importance in the utilization of our invention are polymerization processes wherein an accurate control must be maintained over the rate at which monomer is fed to the polymerization zone as well as over the ratio which this monomer bears to the added solvent. An example of such a process is the solution polymerization of olefins, particularly conjugated dienes, in the presence of organometal catalyst, such as trialkylaluminum and titanium halide, and hydrocarbon solvents. At a later point I will describe my invention specifically in regard to such a process.

Figure 1:
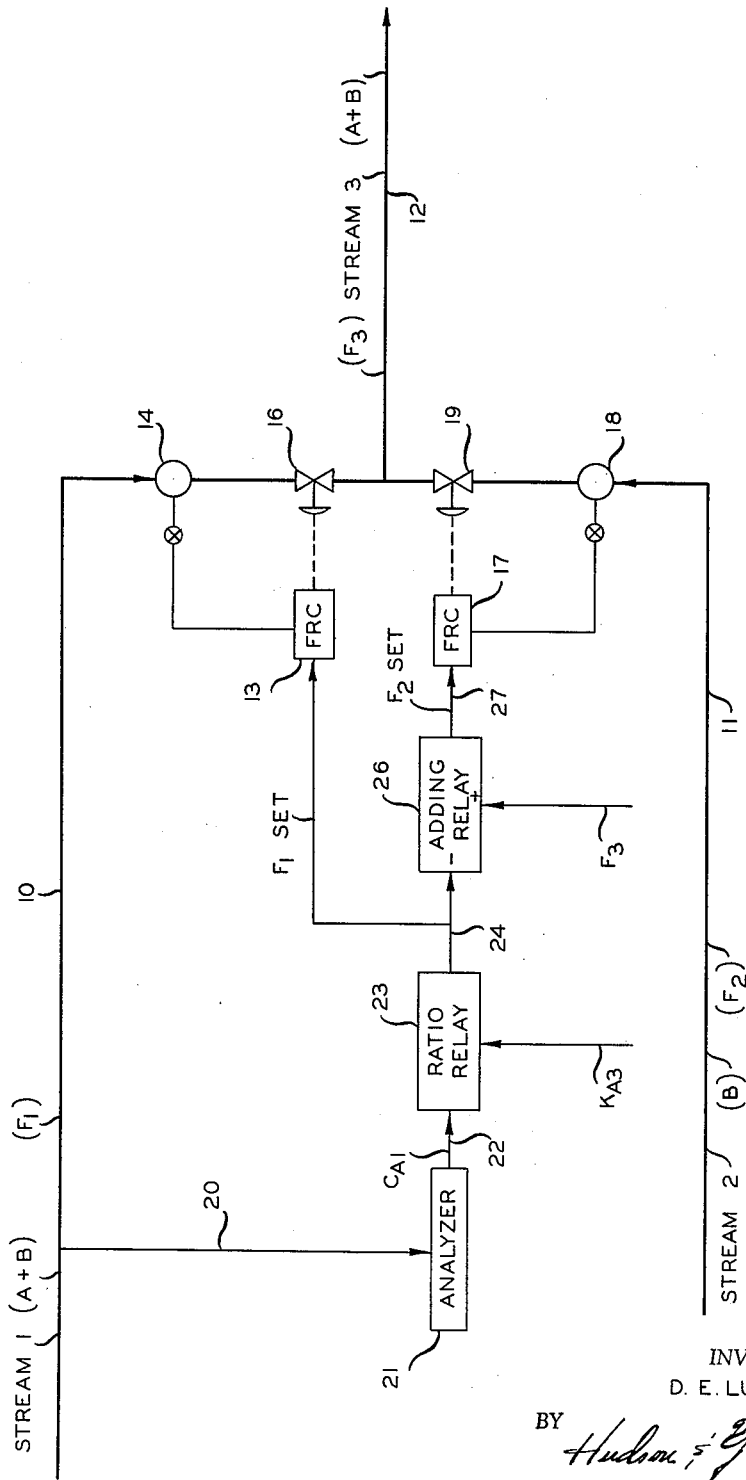
FIGURE 1 is a schematic diagram showing a control system for the blending of two streams, one of which contains two components in variable ratio.

Referring now to FIGURE 1 for a better understanding of the broad aspect of my invention, two conduits 10 and 11 are shown uniting at a junction with a third outlet conduit 12. Stream 1 consisting essentially of components A and B flows through conduit 10 while stream 2 consisting essentially of component B flows through conduit 11. Stream 3 in conduit 12 is the blend of streams 1 and 2 and contains components A and B.

The flow of material through conduit 10 is maintained substantially constant by linear flow recorder controller 13 which is operatively connected to flow sensing element 14 and motor valve 16 in conduit 10. In like manner the flow through conduit 11 is maintained substantially constant by linear flow recorder controller 17 which is operatively connected to flow sensing element 18 and motor valve 19 in line 11. The rates of flow which are maintained in these conduits by controllers 13 and 17 are determined by the set points of said controllers which are in turn manipulated as will be described. Sample line 20 carries a sample of material from line 10 to analyzer 21. Analyzer 21 can be any one of a number of conventional analyzers such as a differential refractometer, an infrared analyzer, an ultraviolet analyzer, a chromatographic analyzer, or the like. The type of instrument chosen will depend upon the type of material in the streams to be blended. For example, I prefer to use a vapor phase chromatographic analyzer with hydrocarbon streams of olefin and solvent. An example of a suitable instrument is a Perkin-Elmer Model 184 Process Fractometer modified for liquid sampling as described in U.S. Patent 2,757,541 to Watson et al. For 0–10 percent butadiene in toluene streams, I prefer to use such an instrument with a control unit as described in copending application Serial No. 777,995 of M. C. Burk, filed December 3, 1958, and a Philbrick U.S.A.—4JT operational amplifier or similar integrator for obtaining butadiene peak area. The output of such an instrument is a quantitative measurement of butadiene concentration on a 2 minute analysis cycle. With the same instrument analyses of both butadiene and toluene can be obtained.

Thus analyzer 21 produces an output signal 22 which is a function of the fraction of sample stream 20 which is component A. This concentration of component A is symbolized as $C_{A1}$. Signal 22, therefore, is transmitted to ratio relay 23. This ratio relay can be a pneumatic or electronic instrument. For example, a Foxboro Type 57ZSR ratio relay is suitable. Also introduced through relay 23 is an input $K_{A3}$ which is representative of the desired flow rate of component A in stream 3. The flow rate of stream 3 is indicated by $F_3$ and the concentration of component A in stream 3, $C_{A3}$, multiplied by the flow rate of this stream, $F_3$, gives the desired total flow rate of component A in conduit 12. Since this is a known desired value, a constant input can be supplied to relay 23 which produces an output 24 which is a function of the ratio of its inputs.

Since component A is supplied to stream 3 only by stream 1, the total mass flow rate of component A in stream 1 is equal to the mass flow rate of component A in stream 3. The mass flow rate of stream 1 is $F_1$. Therefore, $F_1 \times C_{A1} = K_{A3}$ or $F_1 = K_{A3}/C_{A1}$. The ratio of the inputs to relay 23, therefore, is a function of the necessary flow rate, $F_1$, of stream 1 which will produce the desired flow rate of component A in stream 3. Output signal 24 manipulates the set point of controller 13 regulating the flow rate of material through conduit 10.

Signal 24 is also transmitted to adding relay 26 which can suitably be a Foxboro adding relay, Type 56. Also supplied to relay 26 is a constant input $F_3$ which is the desired total flow rate of stream 3 in conduit 12. Input 24 is supplied to the negative input of relay 26 so that output 27 of relay 26 is a function of the difference between the desired total flow in stream 3 and the flow rate of material in stream 1. Since stream 3 is made up entirely of stream 1 and stream 2, then $F_1 + F_2 = F_3$, or $F_2 = F_3 - F_1$. Output 27 is, therefore, a function of the necessary flow rate of stream 2, $F_2$, in order to produce the desired flow rate of stream 3. Signal 27 is employed to manipulate the set point of controller 27 regulating the flow through conduit 11.

It can be seen from the above disclosure in connection with FIGURE 1 that a variation in the composition of stream 1 in line 10 will be sensed by analyzer 21 so that the necessary correction in the flow rate in stream 1 is automatically made in order to prevent non-specification material from being formed in conduit 12. At the same time a corresponding correction is made in the flow rate of stream 2 flowing through line 11 so that the total flow rate of material in conduit 12 remains at a constant value. These corrections are made simultaneously and the correction made in the flow rate of stream 2 does not affect the corrections made in the flow rate of stream 1. This, therefore, is a non-interacting control and also is feed forward control since an analysis is made upstream from the point at which the streams are blended.

The individual instruments shown in FIGURE 1 are well known and commercially available. It is not the intention that any one of these components be claimed as the invention here. It is the combination, rather, of these control features and components to produce the valuable method and system of stream blending which constitutes the subject invention. A number of instruments suitable for use as flow sensing elements 14 and 18 are, for example, well known in the art. A turbine-type flow meter with a frequency converter and manual specific gravity adjustment is preferred for this service where the streams involved are hydrocarbon, such as butadiene and toluene. Flow controllers are likewise standard items and as indicated above the relays can be pneumatic or electronic. For example, in electronic relays conventional operational amplifiers and log function generators can be employed to produce outputs representative of the ratio of two input signals. Adding operational amplifiers with auxiliary amplifiers for changing the sign of one input signal can be employed to obtain the function of the difference between the two input signals.

Figure 2:
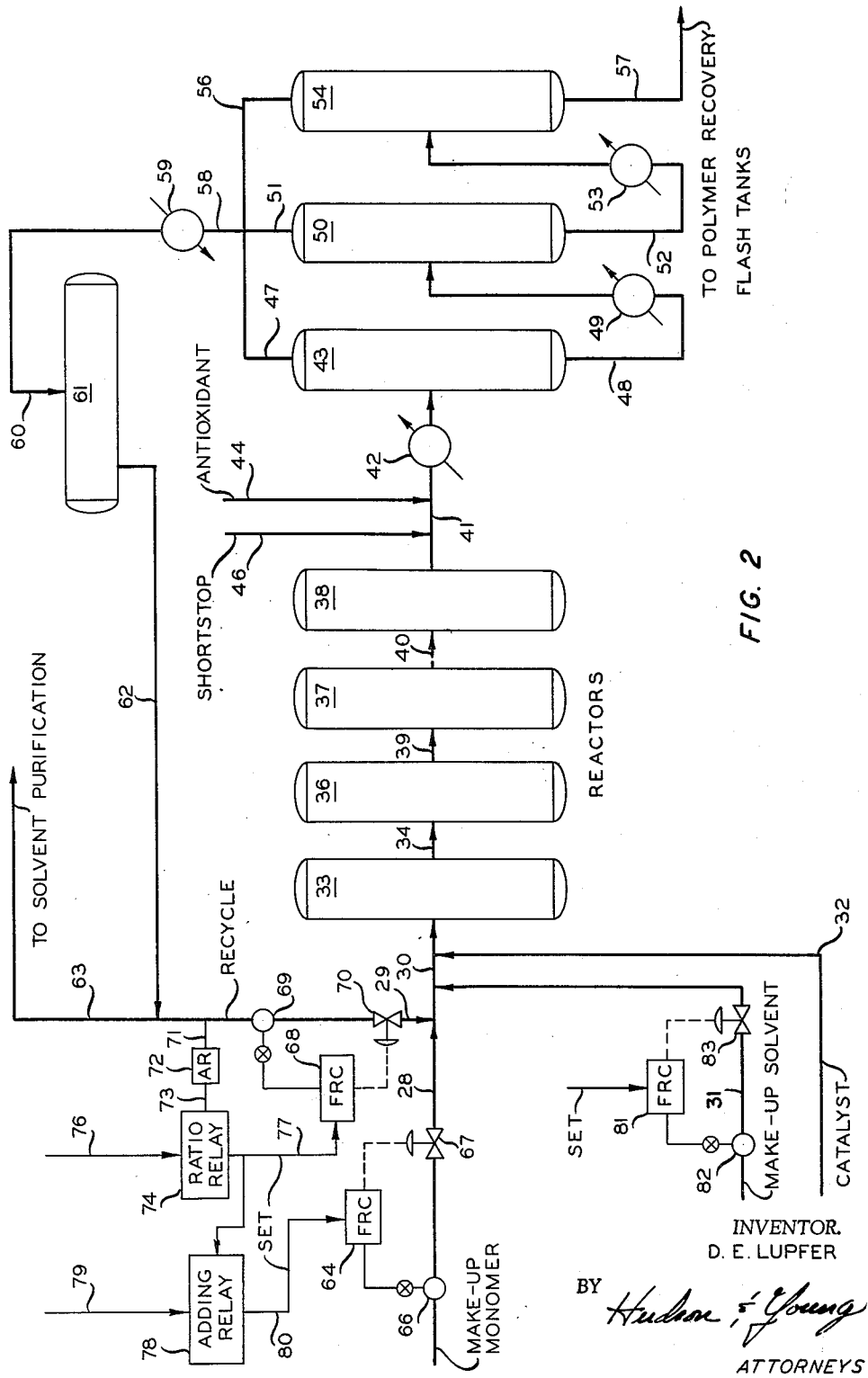
FIGURE 2 is a flow diagram of the control aspect of FIGURE 1 adapted to a polymerization process.

The application of the above described control method to a polymerization process can best be understood by referring to FIGURE 2. In FIGURE 2 a make up stream of monomer in conduit 28 is continuously blended with a recycle stream of monomer and solvent in recycle conduit 29 to produce a combined stream in conduit 30. It is the composition of material flowing through conduit 30 that is controlled according to this application of my invention. With the control of the material produced as the result of blending material in conduits 28 and 29, other materials such as additional solvent in conduit 31 and catalyst in conduit 32 can be added to feed conduit 30 at a constant rate. Feed material in conduit 30, therefore, passes into reactor 33 and then through line 34 to reactor 36. Additional reactors 37 and 38 in the series are shown connected by conduits 39 and 40. Conduit 40 is shown broken to indicate that additional reactors can be employed within the series if desired. Effluent from the last reactor 38 of the series passes through conduit 41 to heater 42, and the heated effluent is flashed in flash chamber 43. Additives such as antioxidant and catalyst shortstop can be added to the effluent in conduit 41 through conduits 44 and 46, respectively.

A substantial portion of the unreacted monomer together with some of the solvent is vaporized in flash chamber 43 and passes overhead through conduit 47. The unvolatilized material is passed through conduit 48 and heater 49 to secondary flash chamber 50. Vaporized material passes overhead from chamber 50 to conduit 51 and the unvaporized material passes from the bottom of this chamber through conduit 52 and heater 53 to flash tank 54. In chamber 54 the remainder of the unreacted monomer is vaporized together with some of the solvent and these vapors pass overhead through conduit 56. Polymer solution which remains unvaporized is passed through conduit 57 to further polymer recovery steps not shown. The vapors in conduits 47, 51 and 56 are combined in conduit 58 and condensed in cooler 59, the resulting condensate passing through conduit 60 to accumulator 61. The condensate from accumulator 61 passes through conduit 62. A portion of this material is purged to solvent purification steps, not shown, through conduit 63, and the remainder is used as recycle in conduit 29. The overall polymerization process having been broadly described, the control features of the invention will now be explained.

The flow rate of makeup monomer in conduit 28 is maintained substantially constant by linear flow recorder controller 64 connected to flow sensing element 66 and motor valve 67 in conduit 28. Flow of material in conduit 29 is maintained substantially constant by linear flow controller 68 connected to flow sensing element 69 and motor valve 70 in conduit 29. A sample of material from conduit 29 is fed through conduit 71 to analyzer recorder 72 which produces a signal 73 transmitted to ratio relay 74. A constant input 76 is also fed to relay 74, this input being proportional to the desired solvent flow in conduit 30 as a result of the combined streams 28 and 29. The output from relay 74 which is a function of the necessary flow rate of recycle material in conduit 29 in order to produce the desired flow rate of solvent in the combined streams is transmitted as signal 77 to manipulate the set point of controller 68. Signal 77 is also transmitted to adding relay 78 together with constant input 79 which is a function of the desired total flow resulting from streams 28 and 29 in conduit 30. The output from relay 78 is signal 80 which is a function of the flow of monomer in conduit 28 required to produce this desired total flow. Signal 80 manipulates set point of controller 64 to obtain this required monomer flow.

As previously stated the flow of solvent in makeup conduit 31 is maintained constant by flow controller 81 connected to flow sensing element 82 and motor valve 83 in conduit 31. Should the ratio of monomer to solvent in recycle conduit 29 vary because of a variation in the operation of the flash concentrators, this deviation is automatically detected by analyzer 72 and the necessary adjustments are made in the flow rates of the recycle stream and the makeup monomer stream so that the combined streams in conduit 30 are maintained at the desired feed composition. The flow of material to solvent purification also necessarily varies and is normally regulated by a liquid level control on concentrator 61. This insures a ready supply of recycle condensate for conduit 29.

In a reaction such as that described for polymerization of monomers such as butadiene in a solvent such as toluene, very frequently inert materials such as low boiling hydrocarbons, for example, butylenes and butane, are introduced with the makeup monomer. In the operation of the control as just described these inert materials are neglected in both the makeup monomer stream and the recycle stream. Many other types of applications of these control features can be employed where minor amounts of other components are present in the stream but these components do not vary substantially and compose such a small proportion of the overall stream that they can be neglected with satisfactory results.

Figure 3:
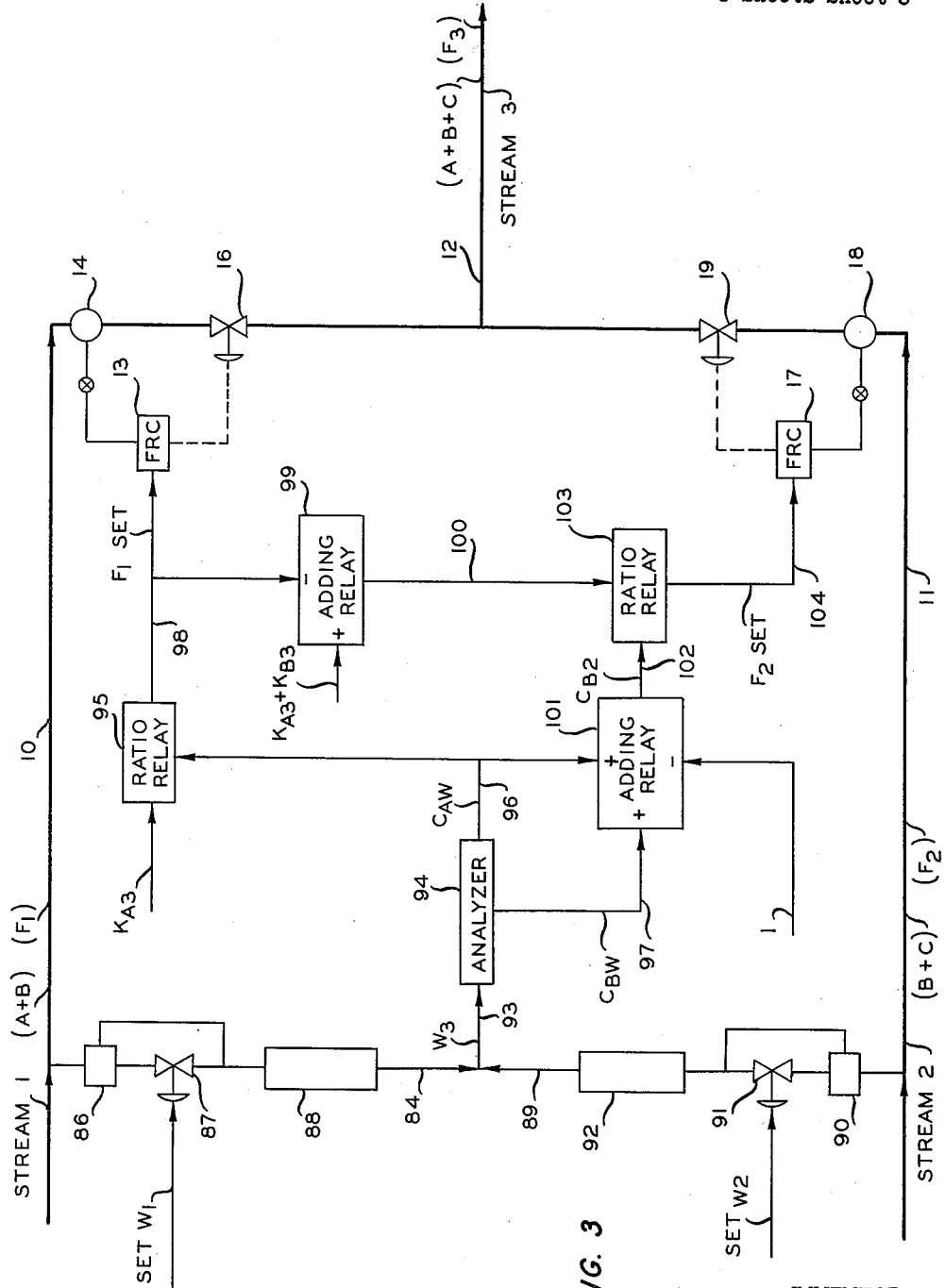
FIGURE 3 is a schematic drawing of the control features of my invention for blending two streams wherein each stream contains two components in variable ratio, one of said components being common to both streams.

In situations wherein the presence of a third component in stream 2 cannot be neglected, the embodiment shown in FIGURE 3 can be employed to obtain the desired results. For comparative purposes, in FIGURE 3 the features which are the same as previously described in connection with FIGURE 1 bear the same reference numerals. For example, conduits 10 and 11 unite to form conduit 12 as the outlet conduit. Stream 1 flowing in conduit 10 contains components A and B with a flow rate $F_1$. Stream 2 flowing in conduit 11 contains components B and C with a flow rate $F_2$, while stream 3 contains components A, B and C and has a flow rate $F_3$. In this case it is desired to maintain the flow rates of components A and B in stream 3 substantially constant. The flow rate of component C can vary and, therefore, the total flow rate of stream 3 can vary by whatever amount component C varies. Since component C is an inert material which does not affect the reaction, it is the flow rates and the ratios of components A and B which should be maintained constant. Flow regulating means involving controllers 13 and 17 for conduits 10 and 11 are the same as shown in FIGURE 1.

Proceeding now with the description of the control as shown in FIGURE 3, a portion of stream 1 is withdrawn from conduit 10 through conduit 84. The flow of materials through conduit 84 is maintained constant by differential pressure flow controller 86 connected around orifice valve 87 in conduit 84. This flow rate ($W_1$) is indicated by rotameter 88 and is established by setting valve 87. A specimen of material is also withdrawn from stream 2 in conduit 11 by way of conduit 89. The flow of material through conduit 89 is maintained constant by controller 90 connected around orifice valve 91 in conduit 89. This flow ($W_2$) is indicated by rotameter 92 and is established by setting valve 91. As an example of commercial equipment suitable for controllers 86 and 90, differential pressure flow controllers Type 63BD of Moore Products Co. can be used. The material in conduits 84 and 89 unite in conduit 93 to provide a sample stream having a flow rate $W_3$. Controllers 86 and 90 are regulated so that flow rate $W_1$ equals $W_2$; therefore flow rate $W_3$ equals $2 \times W_1$. Sample stream in conduit 93 is then fed to analyzer 94 which is the same type of analyzer as previously described except that it is equipped to produce two outputs, output 96 ($C_{AW}$) as a function of the concentration of component A in sample stream 93 and output 97 ($C_{BW}$) as a function of component B in sample stream 93. Output 96 is transmitted to ratio relay 95 together with input $K_{A3}$ which is the desired flow rate of component A in stream 3. Since the sample from stream 1 has been diluted 100 percent with material from stream 2, the analysis $C_{AW}$ for component A in sample stream 93 is one half the fraction of stream 1 which is component A. A bias factor of 2 is, therefore, applied to input 96 in relay 95. Output 98 from relay 95 is a function of the flow rate of stream 1 in conduit 10, $F_1$, and is used to manipulate the set point of controller 13 as described in connection with FIGURE 1. This output is also transmitted to adding relay 99 into which is also fed an input which is equal to the sum of the desired flow rates of component A in stream 3, $K_{A3}$, and the desired flow rate of component B in stream 3, $K_{B3}$. Signal 98 is fed to a negative input of relay 99 so that the output signal 100 is a function of the difference between the sum of the desired flow rates of components A and B in stream 3 and the flow rate of stream 1. Since components A and B make up substantially all of stream 1, this difference represents the flow rate of component B in stream 3 which is supplied by stream 2. Signal 100 is, therefore, a function of the mass flow rate of component B in stream 2 ($F_{B2}$).

Signals 96 and 97 are fed to adding relay 101 wherein these signals are multiplied by 2 and added and from this sum is subtracted a signal which is the function of 1. The constant signal which is a function of 1 is fed to the negative input of relay 101. Output 102 of relay 101 is a function of a concentration of component B in stream 2. This can be shown to be true as follows:

Let $W_1$, $W_2$ and $W_3$ equal the flow rates of the sample streams in conduits 84, 89 and 93 respectively. Also let $C_{BW}$ equal the concentration of component B in the combined sample stream 93, $C_{B1}$ equal the concentration of component B in stream 1, and $C_{B2}$ equal the concentration of component B in stream 2. Also let $C_{A1}$ equal the concentration of component A in stream 1 and $C_{AW}$ equal the concentration of component A in sample stream 93. These concentrations are expressed as a fraction of total stream involved. Since stream 1 consists essentially of components A and B, $C_{B1}+C_{A1}=1$. Also since all of component A in sample stream 93 comes from stream 1, and since sample stream 84 is diluted with equal parts by weight of sample stream 89, the concentration of component A in stream 93 is ½ the concentration of component A in sample stream 84, or in stream 1. Therefore, $C_{A1}=2C_{AW}$. The mass flow rate of component B in sample stream 93 ($W_3C_{BW}$) equals the flow rate of B in stream 84 ($W_1C_{B1}$) plus the flow rate of B in stream 89 ($W_2C_{B2}$). There are, therefore, the following equations:

$$W_3C_{BW}=W_1C_{B1}+W_2C_{B2}$$

Since $$W_1=W_2 \text{ and } 2W_1=W_3$$

therefore $$2W_1C_{BW}=W_1C_{B1}+W_1C_{B2}$$

or $$2C_{BW}=C_{B1}+C_{B2}$$

Since $$C_{B1}=1-C_{A1}$$

and $$C_{A1}=2C_{AW}$$

therefore $$2C_{BW}=1-2C_{AW}+C_{B2}$$

or $$C_{B2}=2C_{AW}+2C_{BW}-1$$

Since the concentration of component B in stream 2 times the flow rate of stream 2 ($C_{B2} \times F_2$) is equal to the flow rate of component B in stream 2 ($F_{B2}$), it follows that the flow rate of stream 2 ($F_2$) is equal to the ratio of the flow rate of component B in stream 2 divided by the concentration of component B in stream 2 ($F_2=F_{B2}/C_{B2}$). Inputs 100 and 102 are, therefore, fed to ratio relay 103 which produces a signal 104 as a function of the necessary flow rate, $F_2$, for stream 2 in order to produce the desired flow rate of component B in stream 3. Signal 104 is employed to manipulate the set point of controller 17. Again, as stated in connection with FIGURE 1, the computer circuits of FIGURE 3 can be either pneumatic or electronic analog circuits. The individual components shown in FIGURE 3 are commercially available.

In order to explain my invention further the following examples are presented. The proportions and conditions given are typical only and should not be construed to limit my invention unduly.

*Example I*

A feed stream of butadiene and toluene is blended with a feed stream of butadiene to produce a product stream of butadiene and toluene having component flow rates of 1256 lbs./min. toluene and 212 lbs./min. butadiene. Under normal conditions the composition of the butadiene-toluene feed stream is 4.99 weight percent butadiene with the remainder toluene, and the total flow rate is 1322 lbs./min. The flow rate of the butadiene feed stream is 146 lbs./min. In connection with the embodiment shown in FIGURE 1, assume that the concentration of the butadiene-toluene feed stream changes so that the stream is now 8 percent butadiene with the remainder being toluene. The deviation from the normal analysis is detected by analyzer 21. As a result the flow rate of the butadiene-toluene feed stream is automatically adjusted to 1365.2 lbs./min. while the same time the flow rate of the butadiene feed stream is adjusted to 102.8 lbs./min., thereby maintaining the flow rates of butadiene and toluene in the combined stream at the desired level. This change is brought about before non-specification blend is produced.

*Example II*

With a system as shown in FIGURE 3 a butadiene-toluene feed stream as stream 1 normally containing 4.992 weight percent butadiene and the remainder toluene with a stream flow rate of 1322 lbs./min. is combined with stream 2 containing butadiene and butylenes, the fraction of butylenes being 2 weight percent. The total stream flow rate of stream 2 is 149 lbs./min. The resulting product is a combined feed stream 3 containing toluene-butadiene and butylenes with a total flow rate of toluene and butadiene of 1468 lbs./min. and a ratio of toluene to butadiene of 5.92. Assume that the concentration of butadiene in stream 1 changes at 8 percent and the concentration of butylenes in stream 2 changes to 4 percent. According to the control system of FIGURE 3 this produces a change in the analysis of the sample stream fed to anaylzer 94 so that the flow rates of streams 1 and 2 are automatically adjusted to 1365.22 lbs./min. and 107.06 lbs./min. respectively, thereby maintaining the desired composition in stream 3.

As will be apparent to those skilled in the art various modifications can be made in my invention without departing from the spirit or scope thereof.

I claim:

1. A method of continuously blending a first fluid stream consisting essentially of components A and B in variable ratio with a second fluid stream consisting essentially of component B to form a third stream containing components A and B in a substantially constant ratio and flow rate which comprises analyzing a sample of said first stream for component A, producing a first signal as a function of the fraction of said first stream that is component A, producing a second signal as a function of the ratio of said fraction to the desired flow rate of component A in said third stream, regulating the flow rate of said first stream in response to said second signal, producing a third signal as a function of the difference between the desired flow rate of said third stream and said flow rate of said first stream, and regulating the flow rate of said second stream in response to said third signal.

2. A method of continuously blending a first fluid stream consisting essentially of components A and B in variable ratio with a second fluid stream consisting essentially of component B to form a third stream containing components A and B in a substantially constant ratio and flow rate which comprises maintaining said first and second fluid streams at substantially constant predetermined first and second rates of flow respectively, analyzing a sample of said first stream for component A and producing from the resultant analysis a first signal as a function of the fraction of said first stream that is component A, producing a second signal as a function of the ratio of said fraction to the desired flow rate of component A in said third stream by utilizing said first signal and a constant signal representative of said desired flow rate of component A, manipulating said predetermined first flow rate for said first stream in response to said second signal, producing a third signal as a function of the difference between the desired flow rate of said third stream and of the flow rate of said first stream by utilizing said second signal and a constant signal representative of said flow rate of said third stream, and manipulating said predetermined second flow rate of said second stream in response to said third signal.

3. In a polymerization process wherein a first stream consisting essentially of monomer and diluent in variable ratio is continuously blended with a second stream consisting essentially of monomer to form a reaction feed stream containing monomer and diluent in a substantially constant ratio and flow rate the improved control method which comprises analyzing a sample of said first stream for diluent content and producing from the resultant analysis a first signal as a function of the fraction of said first stream that is diluent, producing from said first signal and a constant signal representative of the desired flow rate of diluent in said feed stream a second signal as a function of the ratio of said fraction of diluent in said first stream to said desired flow rate of diluent in the feed stream, regulating the flow rate of said first stream in response to said second signal thereby maintaining the flow rate of diluent in the feed stream substantially constant, producing from said second signal and a constant signal representative of the desired total flow rate of said feed stream a third signal as a function of the difference between said desired flow rate of said feed stream and the flow rate of said first stream, and regulating the flow rate of said second stream in response to said third signal to maintain the total flow rate of said feed stream substantially constant.

4. The method of claim 3 wherein said monomer is 1,3-butadiene and said diluent is toluene and said polymerization process employs a catalyst comprising trialkyl aluminum and titanium halide.

5. Stream blending apparatus comprising first and second feed conduits connected to an outlet conduit, first and second rate of flow regulating means in said first and second conduits respectively, component analyzing means communicating with said first conduit to receive a sample therefrom and produce a first signal as a function of the fraction of said sample that is said component, means for computing the ratio between the desired constant mass flow rate of said component in said outlet conduit and said fraction of said sample that is said component and for producing a second signal as a function of said ratio connected to receive said first signal, means for manipulating said first rate of flow regulating means connected to receive said second signal, means for computing the difference between the desired constant flow rate of material in said outlet conduit and the flow rate of material in said first conduit and for producing a third signal as a function of said difference connected to receive said second signal, and means for manipulating said second rate of flow regulating means connected to receive said third signal.

References Cited in the file of this patent

UNITED STATES PATENTS

| | | |
|---|---|---|
| 1,452,265 | Collins et al. | Apr. 17, 1923 |
| 2,707,964 | Monroe | May 10, 1955 |